(12) United States Patent
Brandt et al.

(10) Patent No.: US 8,541,710 B2
(45) Date of Patent: *Sep. 24, 2013

(54) METHOD AND APPARATUS FOR AUTOMATIC GAS CONTROL FOR A PLASMA ARC TORCH

(75) Inventors: Aaron D. Brandt, West Lebanon, NH (US); Christopher S. Passage, Canaan, NH (US); Shane M. Selmer, Ascutney, VT (US); Girish R. Kamath, Lebanon, NH (US); Guy T. Best, Bethel, VT (US); Stephen M. Liebold, Grantham, NH (US); Jon W. Lindsay, West Lebanon, NH (US); Zheng Duan, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/040,787

(22) Filed: Feb. 29, 2008

(65) Prior Publication Data

US 2008/0169272 A1  Jul. 17, 2008

Related U.S. Application Data

(63) Continuation of application No. 11/341,992, filed on Jan. 27, 2006, now abandoned, which is a continuation-in-part of application No. 11/045,012, filed on Jan. 27, 2005, now abandoned.

(51) Int. Cl.
*B23K 9/16* (2006.01)
*H05H 1/34* (2006.01)
*H05H 1/36* (2006.01)

(52) U.S. Cl.
CPC .. *H05H 1/34* (2013.01); *H05H 1/36* (2013.01)
USPC ........... 219/121.39; 219/121.51; 219/121.55; 219/121.59

(58) Field of Classification Search
USPC ............. 219/121.36, 121.41, 121.43, 121.42, 219/121.5, 121.52, 121.53, 121.54, 121.55, 219/121.59
See application file for complete search history.

(56) References Cited

U.S. PATENT DOCUMENTS

| | | | |
|---|---|---|---|
| 3,755,005 A | 8/1973 | Hayasaki et al. | 148/9 |
| 3,819,840 A | 6/1974 | Shultz | 13/1 |
| 3,866,484 A | 2/1975 | Dreshman | 74/422 |

(Continued)

FOREIGN PATENT DOCUMENTS

| | | |
|---|---|---|
| DE | 195 36 150 | 4/1997 |
| EP | 0 370 967 | 5/1990 |

(Continued)

OTHER PUBLICATIONS

International Search Report for International Application No. PCT/US2006/002928 dated Dec. 21, 2006.

*Primary Examiner* — Tu B Hoang
*Assistant Examiner* — Thien S Tran
(74) *Attorney, Agent, or Firm* — Proskauer Rose LLP

(57) ABSTRACT

A method and apparatus for controlling a gas supply to a plasma arc torch uses a proportional control solenoid valve positioned adjacent the torch to manipulate the gas flow to the torch, thereby extending electrode life during arc transfer and shutdown. Swirl ring design can be simplified and gas supply and distribution systems become less complicated. The invention also allows manipulation of shield gas flow to reduce divot formation when making interior cuts. The system can be controlled with a digital signal processor utilizing a feedback loop from a sensor.

20 Claims, 8 Drawing Sheets

(56) References Cited

U.S. PATENT DOCUMENTS

| | | | | |
|---|---|---|---|---|
| 3,912,242 | A | 10/1975 | Schoffmann | 266/23 |
| 3,918,480 | A | 11/1975 | Leo | 137/488 |
| 3,929,324 | A | 12/1975 | Lotz et al. | 266/23 K |
| 4,003,556 | A | 1/1977 | Roeder | 266/48 |
| 4,101,754 | A | 7/1978 | Fischer | 219/121 P |
| 4,111,404 | A | 9/1978 | Benko | 266/58 |
| 4,125,250 | A | 11/1978 | Herbener et al. | 266/50 |
| 4,133,988 | A | 1/1979 | Esibyan et al. | 219/121 P |
| 4,143,929 | A | 3/1979 | Boje et al. | 339/5 M |
| 4,156,125 | A | 5/1979 | Brown | 219/124.02 |
| 4,163,891 | A | 8/1979 | Komatsu et al. | 219/121 P |
| 4,170,727 | A | 10/1979 | Wilkins | 219/121 P |
| 4,172,586 | A | 10/1979 | Schmitt | 266/48 |
| 4,172,587 | A | 10/1979 | Boje et al. | 266/60 |
| 4,180,248 | A | 12/1979 | Benko | 266/67 |
| 4,195,216 | A | 3/1980 | Beauchamp et al. | 219/121 P |
| 4,202,707 | A | 5/1980 | Hennecke | 148/9 R |
| 4,225,769 | A | 9/1980 | Wilkins | 219/130.4 |
| 4,251,205 | A | 2/1981 | Roeder et al. | 431/263 |
| 4,363,468 | A | 12/1982 | Noe | 266/76 |
| 4,410,266 | A | 10/1983 | Seider | 356/45 |
| 4,439,662 | A | 3/1984 | Tateno | 219/121 PY |
| 4,444,169 | A | 4/1984 | Kirisawa et al. | 123/344 |
| 4,466,069 | A | 8/1984 | Balfanz | 364/475 |
| 4,475,719 | A | 10/1984 | Lotz | 266/48 |
| 4,478,393 | A | 10/1984 | Komma et al. | 266/49 |
| 4,602,967 | A | 7/1986 | Komma et al. | 148/9 R |
| 4,644,173 | A | 2/1987 | Jeffers | 250/554 |
| 4,735,399 | A | 4/1988 | Lotz | 266/50 |
| 4,775,774 | A | 10/1988 | Caneer, Jr. | 219/121.55 |
| 4,814,577 | A | 3/1989 | Dallavalle et al. | 219/121.5 |
| 4,817,020 | A | 3/1989 | Chande et al. | 364/557 |
| 4,996,407 | A | 2/1991 | Traxler | 219/121.54 |
| 5,017,752 | A | 5/1991 | Severance, Jr. et al. | 219/121.59 |
| 5,038,016 | A | 8/1991 | Robertson et al. | 219/121.83 |
| 5,039,837 | A | 8/1991 | Nourbakhsh et al. | 219/121.48 |
| 5,070,227 | A | 12/1991 | Luo et al. | 219/121.55 |
| 5,071,106 | A | 12/1991 | Helkenberg | 266/58 |
| 5,120,930 | A | 6/1992 | Sanders et al. | 219/121.5 |
| 5,132,512 | A | 7/1992 | Sanders et al. | 219/121.5 |
| 5,166,494 | A | 11/1992 | Luo et al. | 219/121.55 |
| 5,170,033 | A | 12/1992 | Couch, Jr. et al. | 219/121.51 |
| 5,189,277 | A | 2/1993 | Boisvert et al. | 219/121.54 |
| 5,225,658 | A | 7/1993 | Yamaguchi et al. | 219/121.57 |
| 5,232,196 | A | 8/1993 | Hutchings et al. | 251/129.08 |
| 5,262,612 | A | 11/1993 | Momany et al. | 219/121.67 |
| 5,272,312 | A | 12/1993 | Jurca | 219/121.83 |
| 5,288,970 | A | 2/1994 | Nishi | 219/121.56 |
| 5,290,995 | A | 3/1994 | Higgins et al. | 219/121.44 |
| 5,380,976 | A | 1/1995 | Couch, Jr. et al. | 219/121.44 |
| 5,396,043 | A | 3/1995 | Couch, Jr. et al. | 219/121.5 |
| 5,414,236 | A | 5/1995 | Couch, Jr. et al. | 219/121.39 |
| 5,424,507 | A | 6/1995 | Yamaguchi | 219/121.44 |
| 5,463,202 | A | 10/1995 | Kurosawa et al. | 219/121.83 |
| 5,506,386 | A | 4/1996 | Gross | 219/121.64 |
| 5,521,350 | A | 5/1996 | Nishi et al. | 219/121.56 |
| 5,522,424 | A | 6/1996 | Dalton, Jr. et al. | 137/560 |
| 5,591,357 | A | 1/1997 | Couch, Jr. et al. | 219/121.39 |
| 5,614,110 | A | 3/1997 | Shintani et al. | 219/121.44 |
| 5,638,389 | A | 6/1997 | Nagano et al. | 372/31 |
| 5,653,896 | A | 8/1997 | Couch, Jr. et al. | 219/121.44 |
| 5,695,662 | A | 12/1997 | Couch, Jr. et al. | 219/121.39 |
| 5,717,187 | A | 2/1998 | Rogozinski et al. | 219/121.54 |
| 5,756,960 | A | 5/1998 | Rogozinski et al. | 219/121.54 |
| 5,801,355 | A | 9/1998 | Saio et al. | 219/121.44 |
| 5,828,030 | A | 10/1998 | Naor | 219/121.57 |
| 5,844,196 | A | 12/1998 | Oakley | 219/121.54 |
| 5,866,869 | A | 2/1999 | Schneider et al. | 219/121.39 |
| 5,866,872 | A | 2/1999 | Lu et al. | 219/121.56 |
| 5,893,985 | A | 4/1999 | Luo et al. | 219/121.48 |
| 5,893,986 | A | 4/1999 | Oakley et al. | 219/121.59 |
| 5,900,168 | A | 5/1999 | Saio et al. | 219/121.44 |
| 6,021,682 | A | 2/2000 | Zeng | 73/866 |
| 6,028,287 | A | 2/2000 | Passage et al. | 219/121.56 |
| 6,084,199 | A | 7/2000 | Lindsay et al. | 219/121.52 |
| 6,093,905 | A | 7/2000 | Hardwick et al. | 219/121.59 |
| 6,121,570 | A | 9/2000 | Oakley et al. | 219/121.51 |
| 6,133,543 | A | 10/2000 | Borowy et al. | 219/121.57 |
| 6,163,009 | A | 12/2000 | Hardwick et al. | 219/121.54 |
| 6,188,041 | B1 | 2/2001 | Kim et al. | 219/121.63 |
| 6,222,154 | B1 | 4/2001 | Yamaguchi et al. | 219/121.39 |
| 6,232,575 | B1 | 5/2001 | Oakley et al. | 219/121.55 |
| 6,248,972 | B1 | 6/2001 | Yamaguchi | 219/121.39 |
| 6,274,841 | B1 | 8/2001 | Ramakrishnan et al. | 219/121.44 |
| 6,332,463 | B1 | 12/2001 | Farrugia et al. | 128/204.18 |
| 6,346,712 | B1 | 2/2002 | Popovic et al. | 250/554 |
| 6,359,251 | B1 | 3/2002 | Picard et al. | 219/121.57 |
| 6,365,868 | B1 | 4/2002 | Borowy et al. | 219/121.54 |
| 6,498,317 | B2 | 12/2002 | Hardwick | 219/121.54 |
| 6,590,181 | B2 | 7/2003 | Choo et al. | 219/121.68 |
| 6,622,058 | B1 | 9/2003 | Picard et al. | 700/117 |
| 6,642,482 | B2 | 11/2003 | Rappl et al. | 219/130.5 |
| 6,900,408 | B2 | 5/2005 | Picard et al. | 219/121.55 |
| 6,933,463 | B2 | 8/2005 | Yamaguchi et al. | 219/121.57 |
| 6,947,802 | B2 | 9/2005 | Picard et al. | 700/117 |
| 7,015,416 | B2 | 3/2006 | Delzenne | 219/121.44 |
| 2001/0025834 | A1 | 10/2001 | Billerot | 219/121.46 |
| 2002/0088783 | A1 | 7/2002 | Weber | 219/121.78 |
| 2004/0129687 | A1 | 7/2004 | Yamaguchi et al. | 219/121.39 |
| 2005/0035093 | A1 | 2/2005 | Yamaguchi et al. | 219/121.39 |
| 2005/0173381 | A1 | 8/2005 | Delzenne | 219/121.39 |
| 2006/0091115 | A1 | 5/2006 | Higgins et al. | 219/121.5 |
| 2006/0163216 | A1 | 7/2006 | Brandt et al. | 219/121.39 |
| 2006/0186094 | A1 | 8/2006 | Krink et al. | 219/121.55 |

FOREIGN PATENT DOCUMENTS

| | | |
|---|---|---|
| EP | 0 437 226 | 7/1991 |
| EP | 0998174 | 5/2000 |
| EP | 1 161 126 | 12/2001 |
| WO | 00/41837 | 7/2000 |
| WO | 03/041903 | 5/2003 |

METHOD AND APPARATUS FOR AUTOMATIC GAS CONTROL FOR A PLASMA ARC TORCH

RELATED APPLICATIONS

This application is a continuation of U.S. Ser. No. 11/341,992 filed on Jan. 27, 2006, which is a continuation-in-part of U.S. Ser. No. 11/045,012, filed on Jan. 27, 2005, the contents of each of which are incorporated herein by reference in their entirety. This application claims benefit of and priority to both U.S. Ser. No. 11/341,992 and U.S. Ser. No. 11/045,012.

FIELD OF THE INVENTION

The invention relates generally to plasma arc cutting torches, and more particularly to control systems and methods for controlling gas supplies to such torches to enhance their operation.

BACKGROUND OF THE INVENTION

Plasma arc cutting torches have a wide variety of uses, such as the cutting of aluminum sheet metal, thick plates of steel or stainless steel, or thin sheets of galvanized metal. As illustrated in FIG. 1, a plasma torch 10 includes a torch body 12, an electrode 14 and a nozzle 16 mounted within the body. The nozzle has a central exit orifice 18 and can be surrounded by a shield 22. An exit port 24 of the shield is generally aligned with the exit orifice 18 of the nozzle. A power supply (not shown) is used to create an arc between the electrode 14 and the nozzle 16 ionizing a plasma gas that is supplied from a plasma gas source 30. The ionized plasma gas exits the torch 10 through the exit orifice 18 of the nozzle and the exit port 24 of the shield, and is used to cut a workpiece (not shown). Once the plasma arc has been initiated, the current flow can be transferred from the nozzle to the workpiece.

The shield 22 is mounted to a retaining cap 26 on the torch body 12. Shield gas from a shield gas source 40 can be introduced to a space between the nozzle 16 and the shield 22. At least a portion of the shield gas exits the torch with the plasma arc (i.e., the ionized plasma gas) through the exit port 24 of the shield. The shield gas cools the shield and helps protect the shield from workpiece splatter during a cutting or piercing operation of the torch. The torch can include a swirl ring (not shown) in the flow path of the plasma gas and/or the shield gas to impart a swirling motion to the gas for improving torch performance.

During operation of the torch, certain consumable parts become worn and have to be replaced. These consumables include torch electrodes, nozzles, and shields. Previous patents assigned to Hypertherm, Inc. of Hanover, N.H. teach techniques for prolonging the life of these consumables. For example, U.S. Pat. No. 5,070,227, the contents of which are incorporated herein by reference, teaches that the life of an electrode can be extended by controlled reduction of the plasma gas flow a short time before commencement of the torch current flow reduction, as the cut cycle is ended. U.S. Pat. No. 5,166,494, the contents of which are incorporated herein by reference, describes altering the flow of plasma gas in conjunction with the transfer of the current flow from the nozzle to the workpiece, and U.S. Pat. No. 5,170,033, the contents of which are incorporated herein by reference, explains that a chamber in the swirl ring can be created and sized to favorably affect the dynamic flow characteristics of the flowing gas when torch operating conditions are changed.

FIG. 1 illustrates a known gas distribution feed system for a plasma arc torch. Gas from a gas supply system or a gas cylinder (e.g., plasma gas supply 30 or shield gas supply 40) is regulated to a desired operating pressure using a pressure regulator 31, 41. The reduced-pressure gas passes through an on-off solenoid valve 33, 43 and optionally through a manually operated needle valve 35, 45. On-off solenoid valves (e.g., 33, 43) generally produce an exponentially decreasing pressure decay curve upon closure of the valve. After exiting the needle valve 35, 45, the gas flows to a plasma torch 10. The plasma gas is channeled to the plasma chamber, to a space located between the electrode and the nozzle. The shield gas flows to a space between the shield and the nozzle. A more complex gas distribution feed system is described in U.S. Pat. No. 5,396,043, assigned to Hypertherm, Inc., the contents of which are incorporated herein by reference. The '043 patent describes a plurality of plasma and/or shield gas flow channels and valves of different sizes and configurations that can be used to provide a pre-flow, an operating flow, and a quick charge for use in different operating modes of the torch, such as during piercing operation of the torch, or cutting operation.

Unfortunately, there are drawbacks associated with these different approaches. For example, although the gas flow reduction scheme of the '227 patent extends the lifetime of the electrode, to fully optimize the technology it is necessary to customize the length of hose between the on-off solenoid valve 33 and the torch 10 to achieve a proper volume and resulting gas ramp-down characteristics for a particular torch and consumable set (e.g., electrode and nozzle). This hose volume customization needs to be matched, e.g., to the specific closing characteristics of the on-off solenoid valve 33, such that a precise gas flow profile is achieved about the electrode 14 as the cut cycle is ended. More specifically, it was previously necessary to position on-off solenoid valves 33, 43 at a specified distance from the torch such as 12 inches, 4 feet, or 6 feet, depending upon the system being configured. Empirical determination of the pressure decay curve along with other mechanical adjustments and compensations were then performed to obtain a prolonged life of different consumable sets (e.g., electrodes and nozzles). Such tedious empirical determinations were performed for different torches, systems, consumable sets, and cutting conditions. In such systems, relocating the on-off solenoid valve by one foot, for example, from 4 feet away from the torch to 5 feet away from the torch without recalibrating the current ramp down rates resulted in a dramatic reduction in electrode life (on the order of 30%).

These control difficulties are exacerbated by the rapid system dynamics, which can all take place within a time span of about 300 milliseconds or less. The determination of the proper hose length and current ramp down characteristics to achieve an acceptable termination gas flow profile is empirically acquired and is extremely time consuming. Similar developmental problems are encountered when customizing the gas flow characteristics required for optimal use of the '494 patent, e.g., while transferring the current from the nozzle to the workpiece.

The chambered swirl ring of the '033 patent, while achieving an increase in electrode life, requires fabrication of a complex swirl ring design. Moreover, the inlet and outlet port diameters of such a swirl ring must be carefully fabricated to precise tolerances to achieve the desired gas flow characteristics. Although proper sizing of the swirl ring chamber volume and inlet and outlet port diameters can achieve the desired gas flow results, a given swirl ring is generally useful for only a certain torch type or consumable set necessitating the storage and availability of different swirl rings with varying design criteria. Performance of such swirl rings can also be adversely affected, e.g., by varying gas supply pressures and other gas flow parameters.

Finally, considering the gas distribution feed system of the '043 patent, the multiple flow channels for each gas stream are complex and require many component parts. What is needed is a less complicated, less expensive system to accomplish desired gas flow objectives.

What is also needed is a method and apparatus that can reliably accomplish all of these objectives using fewer component parts and at a reduced manufacturing cost.

SUMMARY OF THE INVENTION

The present invention achieves these objectives by positioning a programmable control valve in the gas line adjacent the torch and manipulating it to control the gas flow.

One aspect of the invention features a method for extending the life of a torch consumable such as an electrode, nozzle, or shield that includes providing a first fluid line such as a plasma gas line for supplying a plasma gas to the torch, and positioning a programmable control valve in the first fluid line adjacent the torch to control a flow of the plasma gas. Manipulation of programmable control valve controls the flow of the plasma gas to the torch during operation of the torch and compensates for a volume in the first fluid line between the proportional solenoid control valve and the torch. Embodiments include locating the programmable control valve near the torch and adjusting an opening of the programmable control valve, such as a flow orifice, or a valve and seat assembly, to change or adjust the flow of the plasma gas a plurality of times during a ramp cycle of the plasma gas. Examples include plasma gas ramp up, such as during torch start up, and plasma gas ramp down near the end of a torch cutting cycle. A control output from a digital signal processor can be used to adjust the programmable control valve to perform at least one of the gas flow controlling or the volume compensating steps. In some embodiments the programmable control valve is a proportional solenoid control valve, such as a Burkert proportional solenoid control valve, although other types of control valves that have suitable control characteristics and response times can be used.

The method for extending the life of the torch consumable can include a sensor disposed between the torch and the programmable control valve, such that the digital signal processor uses a signal from the sensor to adjust the control output to the programmable control valve. The sensor can be a pressure sensor, a flow sensor (such as a mass flow meter), an electrical sensor such as a current measurement, a temperature sensor such as an IR (infrared measurement), and more. The method can also include positioning the sensor in the first fluid line between the programmable control valve and the torch, sensing a parameter (such as one of those mentioned above) in the first fluid line, and using the sensed parameter to adjust the programmable control valve during the controlling step.

The method can also include the step of extending the life of a consumable (such as an electrode or a nozzle) by controlling a ramp-up flow of the plasma gas during start-up of the torch using the programmable control valve, especially when the current flow is transferred from the nozzle to the workpiece. It can also include the step of controlling a ramp-down flow of the plasma gas during shut-down of the torch using the programmable control valve, which can also extend the life of the consumable. In some embodiments, both the ramp-up flow of the plasma gas and the ramp-down flow of the plasma gas are controlled using the programmable control valve. This can be used to reduce the cycle time of workpiece cuts by the torch, thereby increasing production line throughput and capacity. In some embodiments, the torch consumable either is or includes an electrode and operation of the torch includes controlling at least one of a ramp-up or a ramp-down of a flow of the plasma gas based on a type of the electrode installed in the torch, i.e., some electrodes perform better and/or last longer when start-up and/or shutdown is accompanied by a customized plasma gas flow curve.

Another aspect of the invention features a method for control of a gas flow to a plasma arc torch that includes a plasma chamber disposed within a body of the plasma arc torch. The method includes providing a first fluid line for supplying a first gas to the torch, positioning a programmable control valve in the first fluid line adjacent the torch to control a flow of the first gas, and manipulating the programmable control valve (such as a proportional solenoid control valve). Embodiments include locating the programmable control valve near the torch and adjusting an opening of the programmable control valve, e.g., by using a valve with a rising stem-type plunger, to change or adjust the flow of the first gas a plurality of times during a ramp cycle of the first gas. Examples include first gas ramp up, such as during torch start up, and first gas ramp down near the end of a torch cutting cycle. Manipulation of the programmable control valve is used to control the flow of the first gas to the torch during operation of the torch and to compensate for a volume in the first fluid line between the programmable control valve and the torch. The programmable control valve can be a proportional solenoid control valve. In some embodiments the first gas is a plasma gas that supplies the plasma chamber. In others the first gas can be a shield gas that flows to space between a nozzle and a shield of the torch.

The programmable control valve can be directly coupled to the torch body of the torch, e.g., such that there is no hose length between the valve and the torch. In some embodiments, at least a portion of the programmable control valve is disposed within the torch. The method can also include the step of increasing a ramp down time of the flowing first gas to prolong a life of the electrode. This ramp down time can be increased based on, e.g., an increased cut duration of the torch or a higher operating current level of the torch. In some embodiments the ramp down time interval can be decreased to increase the electrode life, e.g., when the torch is being used to make short duration cuts.

The method can also include a vent valve for venting the plasma gas (e.g., to atmosphere), which can be used to decrease the amount of time required to vent the plasma gas, e.g., at the end of a cutting cycle. The vent valve can be a programmable control valve, such as a proportional solenoid control valve. In some embodiments the vent valve can include two or more on-off solenoid valves that are mounted in parallel.

This method can also include positioning a second programmable control valve in a second fluid line, which can be used to supply a second gas to the torch. The first gas can be a plasma gas and the second gas can be a shield gas, and the flow of the second gas can cool and protect from splatter a shield that surrounds a nozzle and is mounted on the torch body. The method can also include diverting at least a portion of the flow of the second gas (e.g., a shield gas) through a third fluid line to join with the flow of the plasma gas to the torch. A third programmable control valve can be positioned in the third fluid line adjacent the torch, to control the diverted shield gas flow. The third programmable control valve can be manipulated to control the flow of the diverted portion of the second gas and to compensate for a volume in the third fluid line between the third programmable control valve and the torch. In another embodiment, the method can include diverting at least a portion of the flow of the plasma gas through a third fluid line to join with the flow of the second gas (e.g., the shield gas) to the torch. The third programmable control valve can be positioned in the third fluid line adjacent the torch to control the diverted plasma gas flow. The third programmable control valve can be manipulated to control the flow of the diverted portion of the plasma gas and to compensate for a volume in the third fluid line between the third programmable control valve and the torch.

In some embodiments the second and/or the third programmable control valve is a proportional solenoid control valve. A control output from a digital signal processor can be used to adjust any or all of the programmable control valves to perform at least one of their respective controlling and the compensating steps. A sensor, such as a pressure, flow, temperature, or mass flow sensor can be located between the torch and the programmable control valve, such that the digital signal processor uses a signal from the sensor to adjust the control output to the programmable control valve. Embodiments include the first gas comprising at least one of oxygen, nitrogen, hydrogen, methane, helium, or argon. In some embodiments, the plasma chamber is defined by an electrode and a nozzle, and the first gas is a shield gas that cools and protects the shield from splatter, where the shield surrounds the nozzle and is mounted on the torch body, e.g., via a retaining cap.

The method can also include the step of adjusting the flow of the first gas (e.g., a shield gas) to reduce formation of a divot in an interior cut of a workpiece, to control slag formation, and/or to improve the quality of a corner cut within a workpiece. Embodiments include controlling the flow of the shield gas to be a piercing flow during a piercing operation of the torch (e.g., when initially penetrating a workpiece), or to be a cutting flow during a cutting operation of the torch (such as during a prolonged cutting operation).

Another aspect of the invention features a method for control of a shield gas flow to a shield surrounding a nozzle and mounted on a torch body of a plasma arc torch that includes providing a first fluid line for supplying a shield gas to the torch and positioning a programmable control valve in the first fluid line adjacent the torch, to control the flow of the shield gas. The programmable control valve is manipulated to control the flow of the shield gas to the torch during operation of the torch and to compensate for a volume in the first fluid line between the proportional solenoid control valve and the torch. The shield gas flow is adjusted to reduce formation of a divot in an interior cut of a workpiece. Embodiments include locating the programmable control valve near the torch and adjusting an opening of the programmable control valve to change or adjust the flow of the shield gas a plurality of times during a ramp cycle of the shield gas. Examples include shield gas ramp up, such as during torch start up, and shield gas ramp down near the end of a torch cutting cycle. In some embodiments the programmable control valve is a proportional solenoid control valve, although other types of valves with suitable flow characteristics and adequate response dynamics can also be used.

Yet another aspect of the invention features a plasma arc torch for cutting a workpiece, wherein the plasma torch has a plasma gas source to supply a plasma chamber. An electrical current passing between an electrode and a nozzle of the torch produces a plasma arc that exits the torch through a nozzle exit orifice. The plasma torch includes a means for sensing a parameter in a first fluid line that supplies a plasma gas from the plasma gas source and a means for controlling a flow of the plasma gas to the plasma chamber based on the sensed parameter using a programmable control valve disposed in the first fluid line adjacent the plasma torch. In some embodiments the programmable control valve is a proportional solenoid control valve. The sensed parameter can be a pressure or a flow of the plasma gas. The torch can also include a means for controlling a flow of a shield gas from a shield gas source to the torch through a second fluid line, the means comprising a second programmable control valve disposed in the second fluid line adjacent the plasma torch. The second programmable control valve can be a proportional solenoid control valve.

The torch can also include a swirl ring that imparts a swirling motion to at least one of the plasma gas or the shield gas, and a control output from a digital signal processor can be used to manipulate one or both of the programmable control valve and the second programmable control valves. The output of the digital signal processor can be adjusted based on the type or thickness of the workpiece to be cut, such that the plasma and/or shield gas flows are thereby adjusted to compensate for these variables. In some embodiments the plasma gas includes oxygen, nitrogen, hydrogen, methane, argon, or mixtures thereof. The nozzle of the plasma torch can be surrounded by a shield mounted to a retaining cap and having an exit port that aligns with the exit orifice of the nozzle.

Another aspect of the invention features a plasma cutting system that includes a power supply and a plasma arc torch for cutting a workpiece. The plasma torch includes a plasma gas source to supply a plasma chamber such that an electrical current passing between an electrode and a nozzle produces a plasma arc that exits the torch through an exit orifice in the nozzle. The plasma torch includes a means for sensing a parameter in a first fluid line, such as pressure, temperature, or flow, which line supplies a plasma gas from the plasma gas source to the torch. The torch also includes a means for controlling a flow of the plasma gas to the plasma chamber based on the sensed parameter using a programmable control valve disposed in the first fluid line adjacent the plasma torch. The programmable control valve can be a proportional solenoid control valve. Other types of valves with suitable control parameters and response dynamics can also be used.

Another aspect of the invention features a plasma arc torch for cutting a workpiece that has a plasma gas source to supply a plasma chamber, and a shield gas source to supply a shield gas. The shield gas passes through a space between a nozzle and a shield, such that an electrical current passing between an electrode and a nozzle produces a plasma arc that exits the torch through a nozzle exit orifice. The plasma torch includes a means for sensing a parameter in a first fluid line that supplies at least one of a plasma gas from the plasma gas source or a shield gas from the shield gas source, and a means for controlling a flow of the first gas based on the sensed parameter using a programmable control valve disposed in the first fluid line adjacent the plasma torch. The programmable control valve can be directly coupled to the plasma arc torch.

Some embodiments include a plasma gas vent valve that includes at least one of a programmable control valve or a plurality of on-off solenoid valves. The vent valve can vent the plasma gas to the atmosphere.

Yet another aspect of the invention features a method for piercing a workpiece with a plasma arc torch. The method includes the step of establishing a plasma gas flow to a plasma chamber in the plasma arc torch, such that the plasma chamber is defined at least in part by an electrode and a nozzle. A plasma arc is initiated between the electrode and the nozzle, and transferred to the workpiece. The flow of the shield gas is adjusted based on cut characteristics of the workpiece, but without significantly adjusting the plasma gas flow. The cut characteristics can include workpiece thickness, the type of material of which the workpiece is made, the type of cut or cuts to be made, and/or the types of process gas or gases being used. The method includes the step of increasing a current flow to the torch to pierce the workpiece, e.g., from a pilot current level to a cutting current level.

The shield gas flow can be adjusted by increasing the shield gas flow during piercing to compensate for an increased workpiece thickness. This can occur when the torch is operating a cutting current level, a pilot current level, or at a piercing current level. Not all embodiments of the invention include using all three of these current levels. Cut characteristics can include at least one of a workpiece thickness, a type of processes being used, a current level of the torch (e.g., a pilot, cutting, or piercing current level), a material type of the workpiece, or the cut shape and geometry.

Adjustment of the shield gas flow can be accomplished using a programmable control valve located adjacent the torch. In some embodiments, the programmable control valve is directly coupled to a body of the plasma arc torch. The programmable control valve can be a proportional solenoid control valve.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
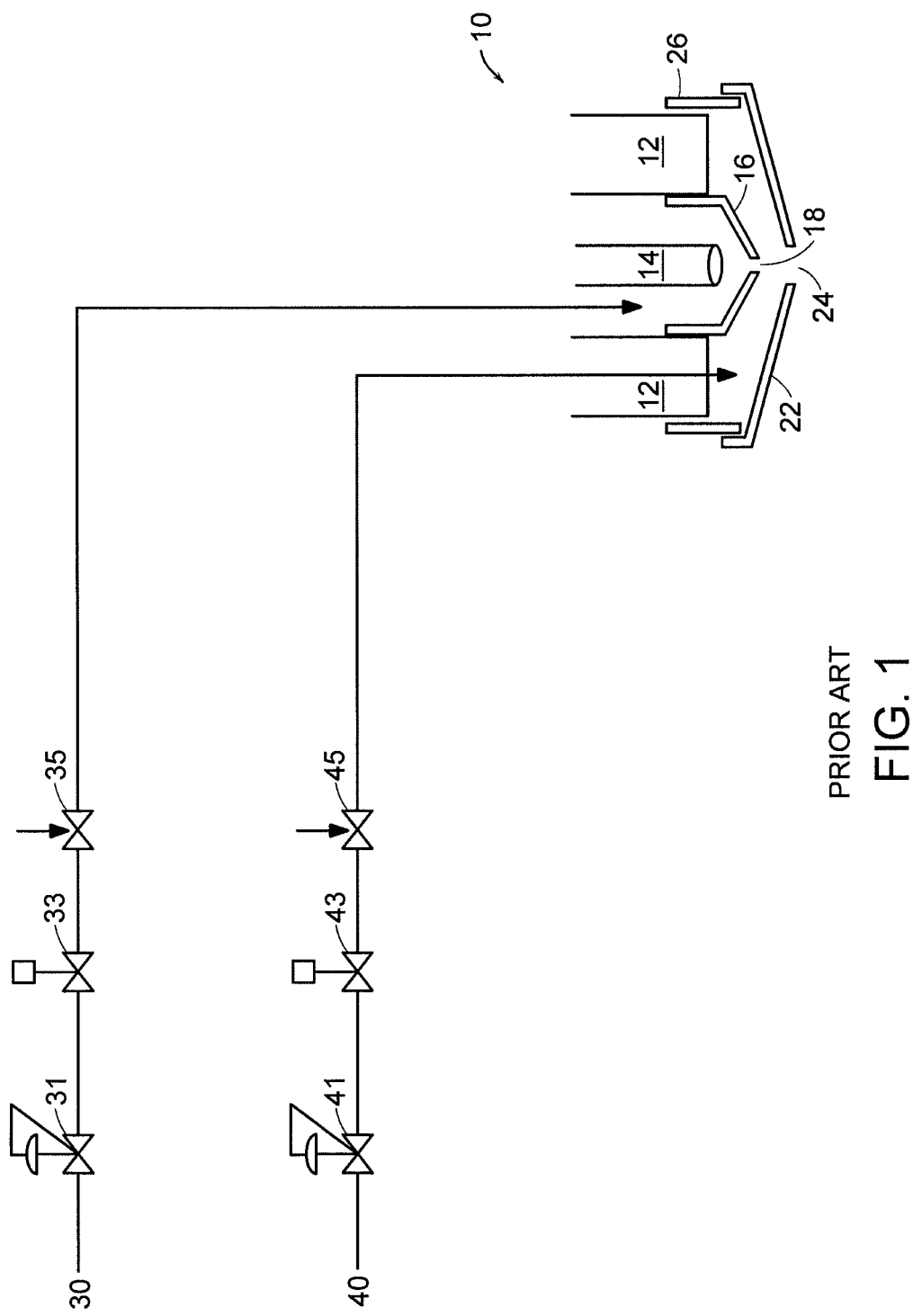
FIG. 1 illustrates a known gas supply system for a plasma arc torch.
Figure 2:
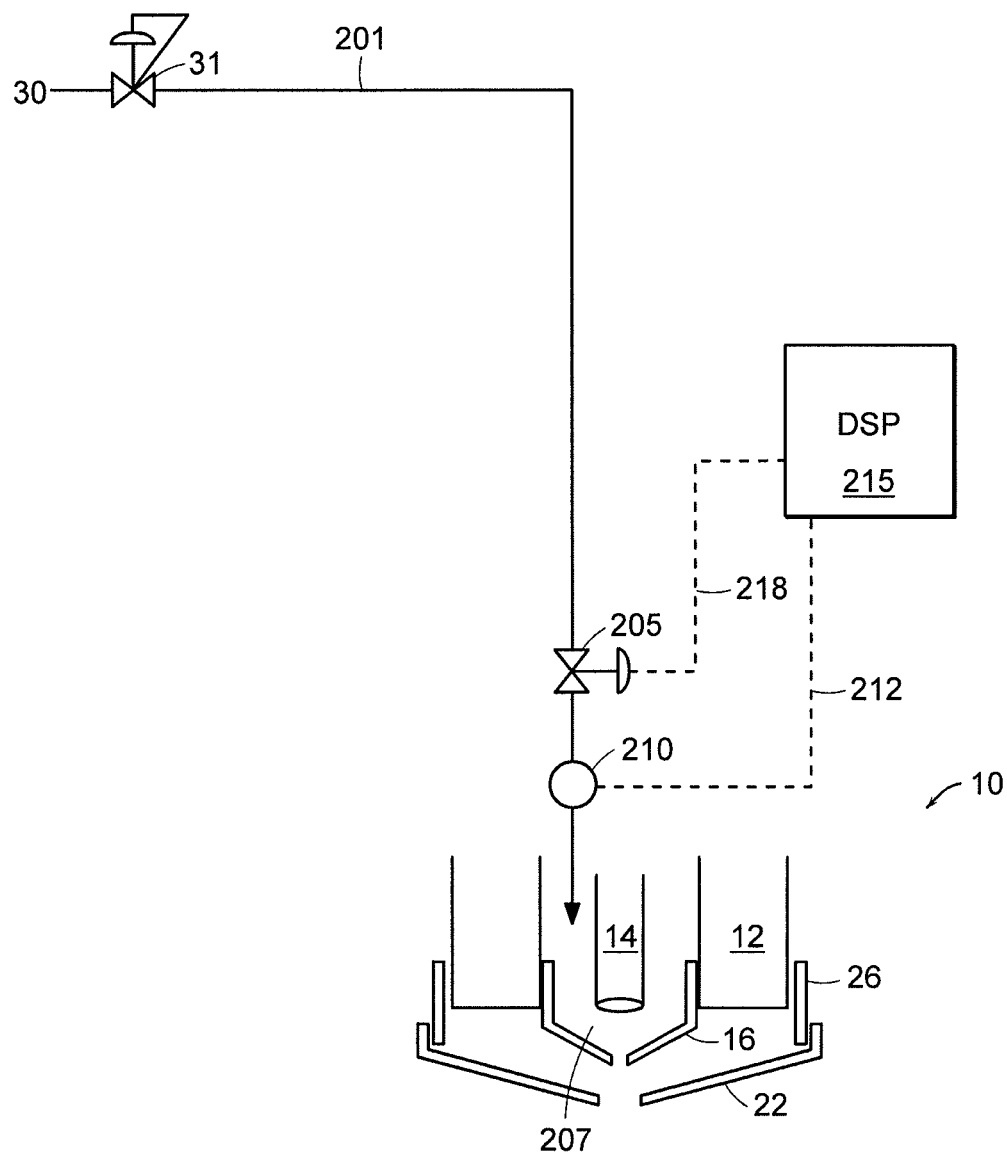
FIG. 2 is a schematic representation of a plasma gas supply system to a plasma arc torch incorporating features of the invention.

FIG. 2 is a schematic representation of a plasma gas supply system to a plasma arc torch incorporating features of the invention. A plasma gas, e.g., including oxygen, nitrogen, and/or argon flows from a plasma gas supply 30 to a plasma gas supply line 201. This first gas supply line channels plasma gas to the plasma torch 10 through a programmable control valve 205 such as a proportional solenoid control valve(see, e.g., 810 Of FIG. 8 , which depicts a method 800 for control of a gas flow a plasma arc torch, in accordance with an embodiment of the invention). The plasma gas flows to a plasma chamber 207 of the torch, and can pass through a sensor 210, such as a flow sensor or a pressure sensor. In some embodiments a signal 212 from the plasma gas sensor 210 can pass to a digital signal processor (DSP) 215 (e.g., a microprocessor, computer, computerized numeric controller (CNC), or PLC), which in turn can manipulate an output 218 to the programmable control valve 205 based on the signal 212. However, the sensor 210 is optional and embodiments include a plasma gas supply line 201 with no sensor 210, and manipulation of the output 218 of the DSP 215 can be based upon other, e.g., predetermined, operating parameters.

Valves suitable for use as a programmable control valve 205 with the invention include actuated valves such as ball, plunger, needle, and varying orifice valves. Although valves that control flow using a flow orifice or opening of variable size are preferred, other valves having suitable flow characteristics and response times can also be used. Servo valves of the same valve styles can also be used. Another suitable programmable control valve is a proportional solenoid control valve such as a Type 6022 or Type 6023 proportional solenoid control valve available from Burkert Fluid Control Systems (http://www.burkert-usa.com) of Irvine, Calif. For example, Burkert valves with a valve coefficient ($C_v$) of 0.12 suitable for use with most aspects of the invention. The input to the valve (e.g., the output 218 from the DSP 215) can be of many different forms, such as an 800 Hz PWM (pulse width modulation) signal, a 0-10 volt DC signal, a 4-20 ma current loop signal (e.g., 24 volt DC), or others, such as are known to those of skill in the art. This listing of valves is not intended to be comprehensive and other valves and types of valves meeting the required performance characteristics can also be used to achieve the objectives of the invention.

Figure 3:
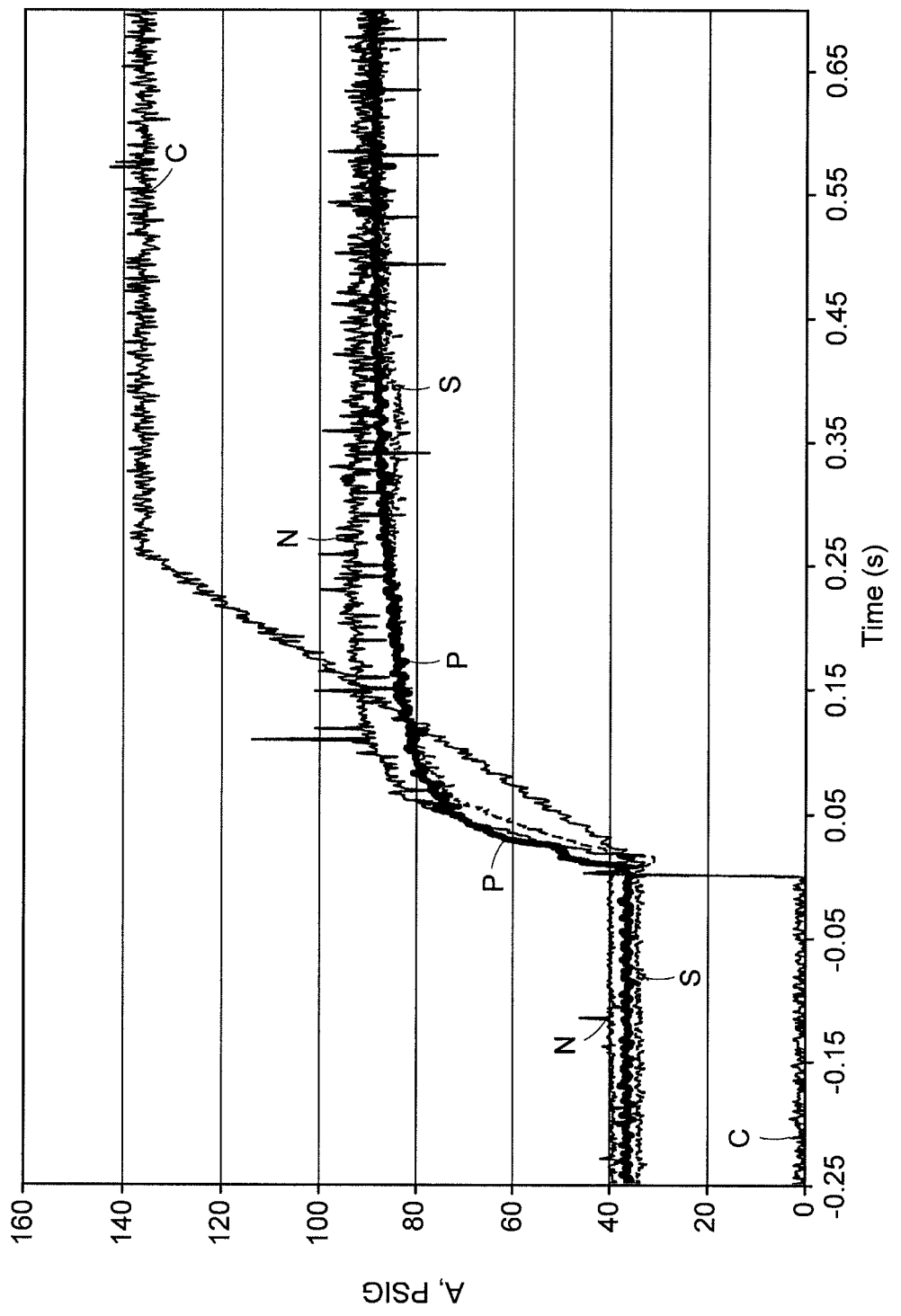
FIG. 3 is a chart depicting plasma gas flow control test data during startup of a plasma arc torch, in accordance with an embodiment of the invention

The programmable control valve 205 differs from previous valves used in gas supplies to plasma arc torches, such as those described above. Applicants have discovered that use of a programmable control valve 205 such as a proportional solenoid control valve having an analog-type control range, suitable flow characteristics, and fast response times, when positioned adjacent the torch allows for very precise dynamic (real-time) manipulation of the gas flow with a control precision that has a dramatic effect on torch operation and consumable life. An example of the precise gas flow control achieved by the invention is illustrated in FIG. 3. In order to achieve results such as these, it is necessary to position the programmable control valve 205 adjacent the torch, i.e., within a reasonable distance. Preliminary testing indicates the plasma gas programmable control valve 205 can be located up to 10 feet away from the torch if certain parameters, such as inside line size diameter are met. For example, for a plasma gas flowing to a plasma arc torch through a plasma gas line having an inside diameter of ⅛ of an inch at between 70 and 90 psig, adequate gas control characteristics can be achieved if the programmable control valve is located not more than 10 feet from torch. Embodiments also include locating the programmable control valve only 6 feet from the torch, and closer. In some embodiments, the programmable control valve functionality is directly coupled, closely coupled to, or is located within the torch. "Directly coupled" means attached (e.g., bolted) to the torch body, or having components of the programmable control valve at least partially installed or mounted within the plasma torch.

As the proximity of the programmable control valve to the torch is increased, i.e., as the programmable control valve is located closer to the torch, the control dynamics of the system improve. Positioning the programmable control valve adjacent the torch permits an effective dynamic response time of the control system to be achieved, thereby reducing a time constant of the system response and allowing a precise and meaningful system response to be achieved (see, e.g., 820 of FIG. 8). As can be seen from FIG. 3, the required speed of response for this example is significantly faster than 300 ms. The mechanical response of the programmable control valve 205 to system changes, e.g., as indicated by sensor 210, occurs at least a plurality of times within a gas ramp (i.e., a ramp up or a ramp down) cycle (e.g., about 300 ms). This rapid mechanical valve response rate is advantageous for both increasing gas ramp cycles (ramp up) and for decreasing gas ramp cycles (ramp down). Moreover, such rapid valve response allows non-constant setpoints (e.g., flow or pressure) to be used, further enhancing the versatility and usefulness of the system. An optimized, predetermined setpoint curve can be used for a given set of cutting conditions, and the predetermined setpoint curve values can be controlled and maintained throughout the gas ramp cycle (e.g., over 300 ms) by the programmable control valve 205 (see, e.g., 820 of FIG. 8). As explained above, achievement of these benefits requires that the programmable control valve 205 be positioned adjacent the torch to provide a suitably fast system response time to changes in valve position, or that this functionality be located within the torch.

Such positioning of the programmable control valve 205, 405 allows a single hose arrangement to be used for many different system configurations and consumable set combinations. This is especially advantageous for mechanized (i.e., robotic) systems and automated cutting tables. For example, the programmable control valve 205 can be manipulated to compensate for the limited volume in the hose between the programmable control valve 205 and the torch (see, e.g., 830 of FIG. 8). However, due to the compressible nature of the flowing fluid, it is necessary that the programmable control valve 205 be positioned adjacent the torch 10 as described above (see, e.g., 820 of FIG. 8).

FIG. 3 is a chart depicting plasma gas flow control test data during startup of a plasma arc torch, in accordance with an embodiment of the invention. In this example, current flow (the curve labeled as "C") is steadily increased from approximately 35 amps to approximately 130 amps from time zero to approximately 200 ms. Previous plasma gas flow results using on on-off solenoid valve 33 are labeled on this chart as curve P. Two different control schemes of the programmable control valve 205 are depicted. The curve labeled N shows a pressure controlled response to the torch using a PID controller and a pressure control setpoint of 85 psig. The curve labeled S illustrates a pressure controlled response using a similar PID controller, but including a step change in the pressure control setpoint. For this example, the initial pressure setpoint is 75 psig through about 350 ms, whereupon the pressure setpoint is changed to 85 psig. Other suitable control schemes will become apparent to the skilled artisan. For example, a pressure setpoint of 75 psig could be used until 250 ms followed by a step change in the setpoint value to 80 psig. At 500 ms a pressure control setpoint step change from 80 to 85 psig could be implemented. Many other setpoint control schemes are also possible, including many more step changes at varying times, or a continuously changing setpoint value over time that follows a smooth contiguous curve.

As is apparent from FIG. 3, to maintain sufficiently precise control of the gas flow (or pressure) over the course of the gas ramp up cycle, a plurality of adjustments by the programmable control valve 205 to the gas flow are necessary. Preferably, these programmable control valve output adjustments are based on a feedback control loop using measurement signals from sensor 210. For effective control, a plurality of programmable control valve output gas flow adjustments are made to cause the gas flow profile to match a desired, predetermined, or previously-used setpoint curve. Each programmable control valve 205 output adjustment results in a repositioning of the mechanical valve, e.g., of a valve plunger with respect to a valve seat within the valve trim section of the valve. When positioned adjacent or at least partially within the torch, not only can the programmable control valve 205 be used to match a setpoint curve of the form of curve P, but setpoint step changes and curves having a continuously changing setpoint value over time (such as those described above) can also be achieved. The programmable control valve is positioned adjacent the torch (as described above) to reduce the time constant of the system response, thereby enabling rapid system dynamics to achieve precise gas control. In this manner, a plurality of programmable control valve outputs to the gas flow, via a corresponding transmission of a plurality of adjustments via the mechanical valve mechanism, can be effectively achieved during a gas flow ramp cycle (e.g., within a few hundred milliseconds), resulting in the consumable life extensions and other benefits described herein. Embodiments also include only three to five programmable control valve output adjustments during a gas ramp cycle, while other embodiments include dozens or even continuous adjustments.

In contrast, if the programmable control valve 205 is not located adjacent the torch, i.e., is too far from the torch, then the time constant of the system is too slow and rapid, fine valve trim adjustments of the programmable control valve 205 do not result in the fine, predictable, controllable flow required to accomplish the objectives of the invention.

Moreover, the plurality of programmable control valve output adjustments described above can be used in conjunction with sensor 210. A feedback control loop using a signal from the sensor 210, e.g., via DSP 215, can be used to efficiently control the gas flow. Using this technique in combination with programmable control valve 205 located adjacent the torch allows realization of unprecedented plasma torch control benefits to be achieved when the feedback loop cycles a plurality of times during a ramp cycle of the plasma (or shield) gas.

In addition to the PID controller described above, other control schemes can also be used, such as a gap action controller, a hysteresis controller, and other control methods and techniques known to the skilled artisan. Moreover, sensor control parameters other than pressure can be used. For example, embodiments include using a flow sensor with a sufficiently rapid response time in place of a pressure sensor, a temperature signal from a strategic point within or about the torch, a mass flow sensor, or visual or electrical measurements (such as current flow). Although feedback control techniques are often preferred, open loop control systems can also be employed in connection with control of the plasma gas flow. Such open loop control methods can be based on, e.g., empirical test results or calculated values.

The invention can also be used to realize additional advantages. Now that precise flow or pressure control of the plasma gas is no longer linked to the specific hardware configuration employed, plasma gas ramp-up flow controls (e.g., during arc transfer from the nozzle to the workpiece) and/or plasma gas ramp-down flow controls (e.g., during torch shutdown) can be customized to more fully optimize the lifetime of torch electrodes, nozzles, and the like. Compensation for various nozzle orifice and shield exit port sizes, varying volumes into the plasma chamber and between the electrode and nozzle, and for trapped volumes between the torch 10 and the programmable control valve 205 can now be readily achieved. Moreover, consumable lifetime optimization can now be performed by precisely synchronizing and optimizing plasma gas flow with torch current increases and/or decreases. Such synchronization can take many forms. For example, the ramp rate of gas flow can be the same as or greater than the rate of change of the current during one portion of the cycle, and less than the rate of change of the current during another portion. Many combinations are now possible. Previous gas flow optimization results have been rudimentary in comparison with those achievable by the present invention, having been severely limited by the gas flow profiles previously obtainable. Achievable gas flow profiles have now been decoupled from the mechanical constraints of previously-used control hardware and system arrangements.

The properly positioned plasma gas programmable control valve 205 can also be manipulated to achieve other objectives. For example, the function of the chambered swirl ring described in U.S. Pat. No. 5,170,033 (described above) can now be achieved using the programmable valve 205. Whereas previously it was necessary to physically size the chamber inlet and/or outlet ports to achieve the desired swirl ring gas flow characteristics, the present invention allows similar results to be achieved using a swirl ring having no chamber. Moreover, the swirl ring ports can be oversized, and the requisite flow control can be achieved using the programmable control valve 205 and, optionally, sensor 210. The resulting system is thus simpler and less costly to manufacture. The system can also be used to respond to plasma gas supply pressure fluctuations. This feature is particularly useful for shop operations having torches supplied from a header system that is prone to such fluctuations.

Figure 4:
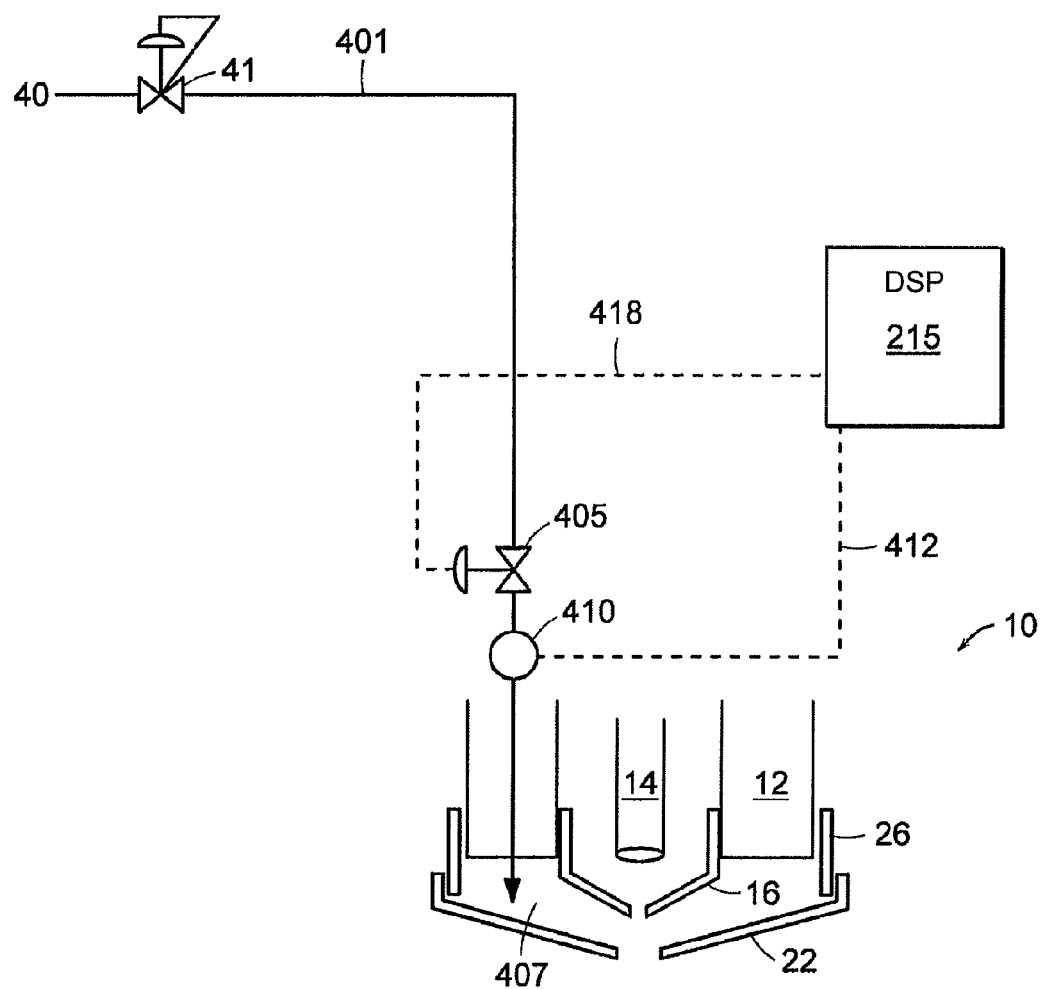
FIG. 4 is a schematic representation of a shield gas supply system to a plasma arc torch incorporating features of the invention.

FIG. 4 is a schematic representation of a shield gas supply system to a plasma arc torch incorporating features of the invention. A shield gas, e.g., including oxygen, nitrogen, hydrogen, methane, argon, helium, air, and/or mixtures of these gases, flows from a shield gas supply 40 to a shield gas supply line 401. This gas supply line channels shield gas to a space 407 between the nozzle 16 and the shield 22 through a programmable control valve 405 such as a proportional solenoid control valve. The types of valves described above in connection with the programmable control valve 205 for the plasma gas can also be used as a programmable control valve 405 for the shield gas. As described above, the programmable control valve 405 must be located adjacent the torch, e.g., within 2 feet.

Preliminary testing indicates that for shield gas flow the programmable control valve 205 can be located up to 10 feet away from the torch if certain parameters, such as inside line size diameter are met. For example, for a shield gas flowing to a plasma arc torch through a gas line having an inside diameter of 3/16 of an inch at between 30 and 50 psig, adequate shield gas control characteristics can be achieved if the programmable control valve is located not more than 10 feet from torch. Embodiments also include locating the programmable control valve only 6 feet from the torch, and closer. As discussed above in connection with programmable control valve 205, the proximity of the programmable control valve to the torch is increased, i.e., as the programmable control valve is located closer to the torch, the control dynamics of the system improve. The mechanical response of the programmable control valve 405 to system changes, e.g., as indicated by sensor 410, must occur at least a plurality of times within a gas ramp cycle. Gas ramp cycle times for both plasma and shield gases can be about 300 ms, although longer ramp cycles, and considerably shorter ramp cycles, are sometimes used and are within the scope of the invention. As with plasma gas control, shield gas setpoints can also be variable over time having, e.g., the form of a curve, a step function, or a linear ramp through the gas ramp cycle. The programmable control valve 405 is located adjacent the torch to achieve benefits of this embodiment of the invention by providing a time constant of the shield gas response system that is sufficiently small to allow precise process control of the gas flow to be achieved. The operational requirements of the shield gas programmable control valve 405 are similar to those of the plasma gas programmable control valve 205 described above, in that a plurality of mechanical output adjustments by the programmable control valve 405 to the gas flow during the gas ramp cycle are required to achieve the objectives of the invention.

After passing through the programmable control valve 405 the shield gas can be routed through a sensor 410. An output 418 from a DSP 215 can be used to manipulate the programmable control valve 405 based on a signal 412 from the sensor 410. Sensor types and control strategies described above for use with the plasma gas supply system can also be used with the shield gas system. Although feedback control techniques are often preferred, open loop control systems can also be employed for the shield gas. Such open loop control methods can be based on, e.g., empirical test results or calculated values. For example, in the absence of real time feedback information, the results of previous testing can be used to determine a preferred output curve. This empirical test information can also be used in actual feedback control situations as a control setpoint from which the feedback control loop operates. Valve output amounts can also be at least partially based on factors such as the calculated volume through which the gas flow will pass before reaching the torch, the gas supply pressure, and the like, and these calculated values can be used to determine valve output amounts or to adjust valve output dynamics (e.g., control loop setpoint adjustment or tuning). Similar techniques can be used for plasma gas control.

Additional control objectives can be achieved using the shield gas control system. The shield gas control techniques described herein can be implemented either in combination with, or independently of the enhanced plasma gas control described above. For example, torch performance is improved by appropriate shield gas control during piercing and cutting operations as taught in U.S. Pat. No. 5,396,043, described above. Such objectives can be readily obtained using the present invention, but using fewer components and gas lines than previously required. For example, the single shield gas supply line 401 of the present invention can be used to provide the pre-flow, operating flow, and quick charge flows described in the '043 patent. Moreover, positioning the programmable control valve 405 near the torch 10 allows it to be used to manipulate the shield gas flow to provide both the piercing gas flow and the cutting gas flow at different times, as described in the '043 patent. For example, during workpiece piercing operation (e.g., at the commencement of a cut) rapid and strategic increases in shield gas flow can be used to reduce slag formation and slag blowback to the torch shield 22.

Figure 5:
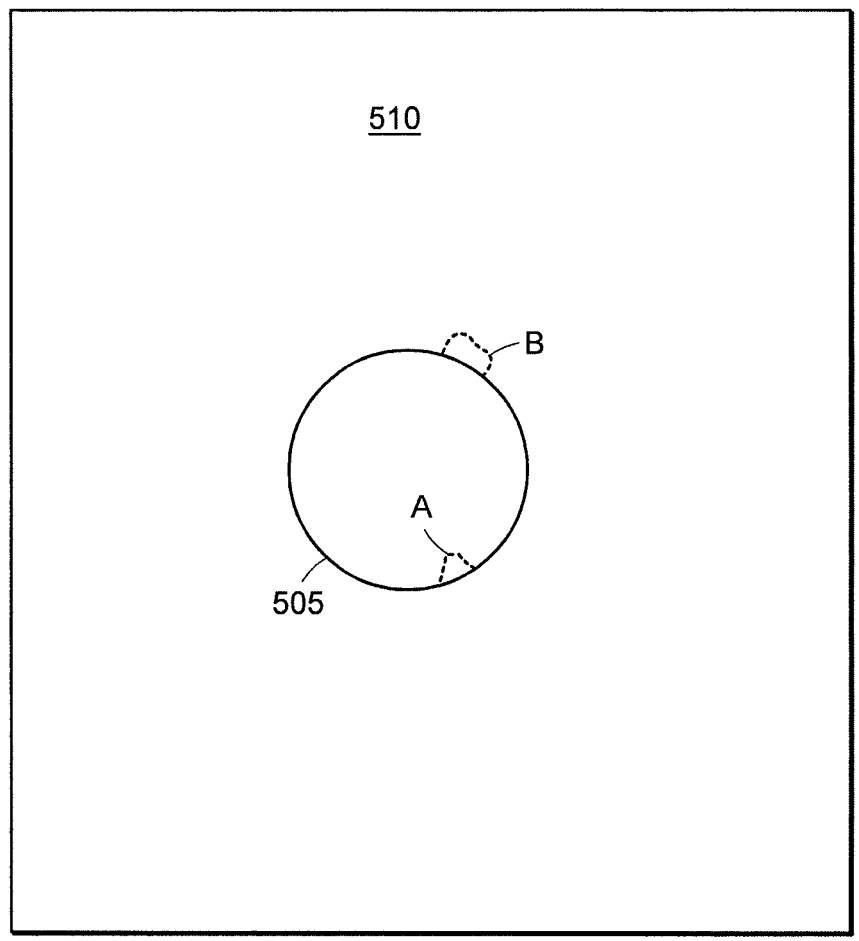
FIG. 5 illustrates the control of divot formation achievable with an embodiment of the invention.

Improved control of divot formation can also be obtained. FIG. 5 illustrates divot formation results achievable with an embodiment of the invention. When creating an interior cut within a workpiece divots and dross are commonly formed, especially at the end of the cut. A divot is formed when the end of the cut perimeter is returned, e.g., to the starting point. FIG. 5 illustrates the perimeter of an interior circular cut 505 within a workpiece 510. In some situations an interior divot A can be formed when the start and end point of the cut is at A. In other situations an exterior divot B can be formed, when the start and end point of the cut is at B. Preferably, in this example, a circular interior cut 505 would be achieved resulting a circular hole without the formation of any divots (i.e., without A or B).

Different techniques can be used to achieve a divot-free cut. For example, withdrawing the torch from the workpiece surface while still in full operating mode will reduce divot and dross formation, but results in premature damage to the torch electrode. Alternatively, the current flow can be slammed off (immediately truncated) at the end of the cut, but this also results in premature electrode failure. Another technique involves using a controlled ramp down of the shield gas flow, along with torch current ramp down flow management, to achieve a divot-free cut. The invention allows unprecedented benefits of this technique to be maximized. Embodiments of the invention also provide for cut optimization when performing interior corner cuts (not shown). Controlled reduction of shield gas and current flow as the torch makes an interior corner cut results in improved corner cut quality.

Additional advantages can be realized utilizing the invention. For example, torch operation can be optimized to accommodate different end cut requirements, such as for small holes and other specialized workpiece cut designs and features. Moreover, the ability to precisely and independently control shield gas flow and torch current allows customization to be performed to better accommodate different workpiece materials and thicknesses.

Additional illustrative embodiments of the invention include improved shield gas flow for workpiece piercing operations. After arc ignition and transfer of the arc current to the workpiece, some cutting applications establish a piercing flow, e.g., to initiate a cut in the center of a workpiece. The programmable control valve 405 for the shield gas can be used to increase the shield gas flow (or pressure) during piercing operations, thereby increasing the amount of shield gas force and momentum at the cutting location on the workpiece, independently of the plasma gas control flow or amount. After the workpiece has been pierced, the shield gas flow can be reduced to normal flow rates, e.g., for a subsequent cutting operation. This subsequent reduction in flow reduces shield gas consumption and can be set to improve or control the cut angle and reduce dross formation.

The extra shield gas force provided during piercing assists the pierce operation, helping to clear away molten workpiece material as the initial hole is pierced through the workpiece. Extra plasma gas momentum can also be provided using the programmable control valve 205 for the plasma gas, but high plasma gas flow/pressure during piercing operation can reduce the life expectancy of the electrode. For this reason, it is generally preferred to provide the additional gas momentum using the shield gas flow, and to provide little or no additional momentum from the plasma gas. The ability to utilize increased shield gas flow during piercing and a lower flow during steady-state cutting allows piercing capabilities to be enhanced without sacrificing electrode life.

Consideration of additional process factors can also result in enhanced performance. For example, different types of workpiece piercings benefit from different operating characteristics. Piercing types are affected by factors such as the process gases (shield and plasma gases) being used, the actual and nominal current levels, the material being cut, the thickness of the workpiece, and the cut shape and geometry. Customization of the shield and/or plasma gas flows allows cut performance enhancements to be achieved by compensating for variables such as these. For example, increasing shield gas flows as torch piercing current levels are increased results in improved piercing operations. Similarly, benefits are also achieved by increasing shield piercing gas flow as the thickness of the workpiece to be pierced increases. After the initial workpiece piercing is accomplished the shield gas can be reduced to improve the cut angle (i.e., make it more vertical) and reduce dross formation.

However, the increase in shield gas piercing flow described above can be unhelpful or undesirable for thin workpieces or workpieces that have fine (intricate) cut features. Piercing (and cutting) of such features may actually benefit from reduction of the shield gas flow. Additionally, benefits can be achieved and operation of the system streamlined by selecting pierce plasma and shield flow rates, e.g., automatically, from DSP 215 (e.g., a CNC) based on the pierce-type characteristics described above. These parameters can be stored, e.g., in electronic form, in a "cut table" for quick reference and utilization by the cut program. The cut table can store cutting shapes and parameters for ready reference by the cut program or, e.g., for selection and use by the equipment operator.

Figure 6:
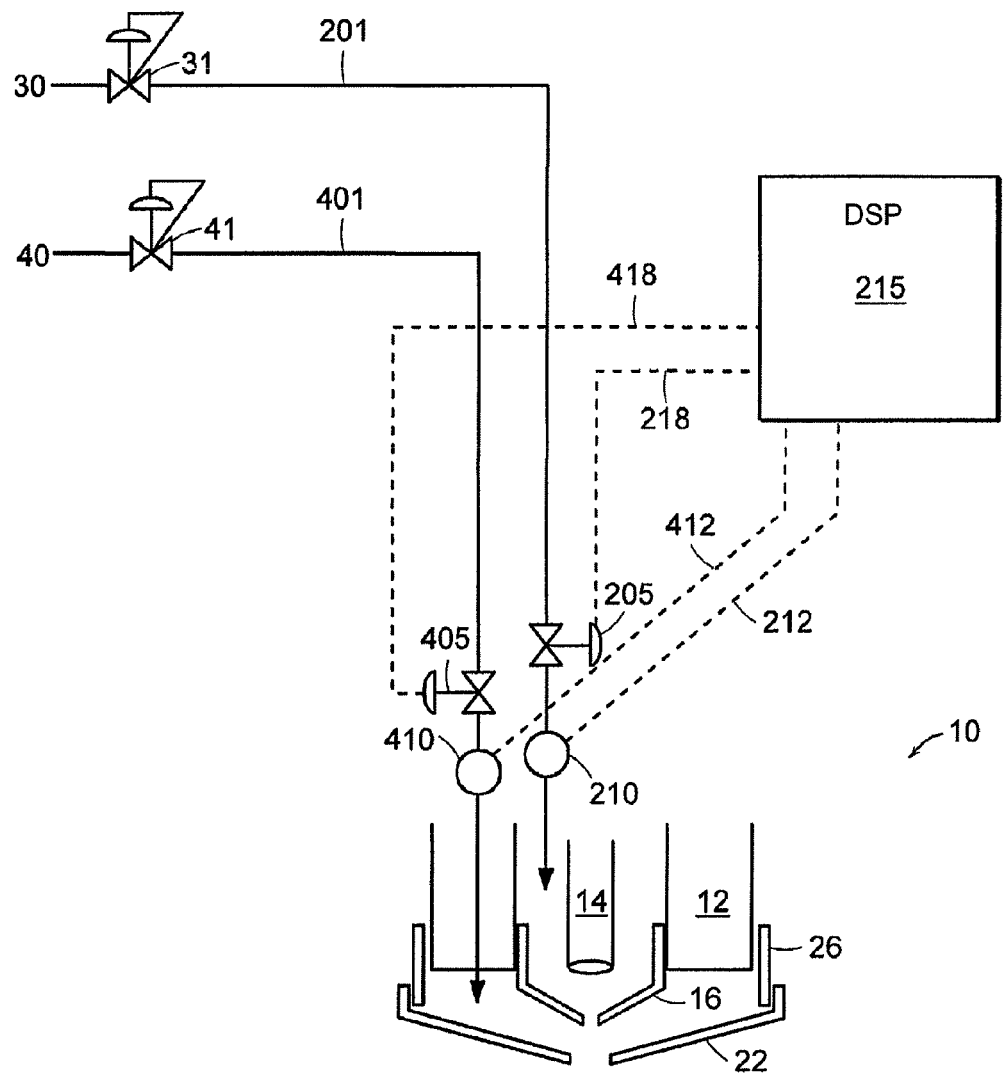
FIG. 6 is a schematic representation of a combined plasma gas and shield gas supply system to a plasma arc torch.

FIG. 6 is a schematic representation of a combined plasma gas and shield gas supply system to a plasma arc torch. A plasma gas programmable control valve 205, such as a proportional solenoid control valve, is positioned adjacent the torch 10 in the plasma gas supply line 201. A shield gas programmable control valve 405, such as a proportional solenoid control valve, is positioned adjacent the torch 10 in the shield gas supply line 401. Optionally, a sensor 210 is present in the plasma gas line 201 and provides a control signal 212 to a DSP 215. Also optionally, a sensor 410 is present in the shield gas supply line 401 and provides a control signal 412 to DSP 215. The sensors 210, 410 can measure different types of physical parameters, such as flow, pressure, and others, such as those described above.

In addition to advantages described above, this embodiment of the invention allows additional advantages to be realized. For example, precise and dynamic real-time control of three independent variables is now possible-torch current, plasma gas flow, and shield gas flow. Manipulation of these variables allows unprecedented optimization of cut cycle times since faster ramp-up and ramp-down times can now be achieved without sacrificing consumable life. In many operations, and especially in automated mechanized operations, workpiece cut cycle times can be further optimized in view of, e.g., electrode and nozzle life. This embodiment of the invention allows processing time to be reduced using plasma gas ramp-up and ramp-down controls in conjunction with precise current controls, along with the time saving benefits achieved by faster and better shield gas piercing and cutting controls. A more precise optimization between cut cycle time and consumables life expectancy can now be achieved, resulting in greater productivity, more efficient utilization of manufacturing equipment and resources, and increased cost savings or throughput. Of course, the workpiece piercing, divot, cut angle, and dross minimization benefits described above can also be achieved.

Embodiments of the invention include enhanced gas ramp up and ramp down flow controls for the plasma gas and/or the shield gas based, e.g., on the shape, thickness, material, cut type, and cut duration for the workpiece being processed. It is known that plasma gas ramping techniques are especially useful for prolonging electrode life when the steady state cutting process is transitioned to torch shutdown (i.e., extinguishing the arc), and when the initiated plasma arc is transferred to the workpiece. More precise control of the shield and/or plasma gas flows is achievable to better compensate for variables such as the shape to be cut, the material and thickness of the workpiece, the type of cut to be made (e.g., a piercing cut, a lengthy contour cut, a straight cut, or a corner or an intricate feature), divot reduction, and the cut duration. These setpoint adjustments can be effectively controlled during one or more stages of a cutting cycle (e.g., plasma arc initiation; transfer of the plasma arc to the workpiece; piercing; steady-state cutting; shape cutting; and arc extinguishment), resulting in benefits that were not previously achievable.

For example, embodiments include adjusting the plasma gas ramp down rate as the cutting process is being shut down such that the ramp down rate is slower for longer duration cuts. As described herein, a slower ramp down rate means a gas ramp down period that has a longer time interval. A ramp down cycle can commence when reduction of a cutting current begins, and this ramp down cycle can finish when the current flow is terminated. In this example, a 100 millisecond ramp down time period would be considered faster than a 500 millisecond time period for the same ramp down cycle. Conversely, a gas ramp up cycle can commence when a pilot current begins to increase to a cutting level, and the ramp up cycle can finish when the cutting current level is achieved. A faster ramp up cycle will take less time (have a shorter duration) than a shorter ramp up cycle.

Applicants have learned that electrode life is prolonged when the plasma gas ramp down time is increased after the electrode has been in operation for a longer period of time. For example, when performing a series of 60 second cuts with a torch, increasing the plasma gas ramp down time (e.g., from 100 milliseconds to 400 milliseconds) dramatically increases the life of the torch electrode. Moreover, Applicants have also learned that an increased plasma gas ramp down time extends electrode life expectancy when a torch is operated at a higher current (e.g., 260 amps or 400 amps) as compared with a torch that is operated at a lower current level (e.g., 130 amps or 70 amps). It is believed that the additional ramp down time facilitates non-turbulent cooling of the emissive material (e.g., hafnium) at the electrode tip.

As an example, Applicants have learned that a slower ramp down rate (i.e., more ramp down time) also enhances electrode life for repetitive workpiece cuts of equivalent time duration when applied to a torch/electrode that is operated at a high current level. For example, applying an increased (i.e., slower) ramp down time to a 260 amp electrode that is performing 4 second cuts extends the life of such an electrode as compared with the amount of electrode life achieved by applying the same ramp down time increase to a 130 amp electrode operating under similar conditions. In this example, the electrode life enhancement of the lower current electrode (the 130 amp electrode) is not as pronounced as the electrode life enhancement of the higher current (the 260 amp) electrode. For these examples, the electrode life is measured by the number of torch starts that can be accomplished with the electrode before the electrode fails. Similarly, to prolong electrode life a slower plasma gas ramp down rate (i.e., a longer ramp down time) should be used when reducing a cutting current from 400 to 75 amps, as compared with from 200 to 75 amps. For example, where this ramp down time was previously 100 milliseconds, the programmable control valve 205 can be used to lengthen this ramp down time period to 500 milliseconds. Applicants use these parameters to achieve an optimized balance between electrode life and cycle time ("duty cycle"). For example, faster cut to cut cycle times for short cut durations on thinner workpieces, such as fine features and holes allows these pieces to be produced more rapidly without sacrificing electrode life. But longer cycle times employing customized and longer gas ramp times (e.g., for the plasma gas) are warranted for thicker workpieces that require longer cuts and that generate and accumulate additional internal electrode heat.

Applicants have also learned that when performing a series of short cuts with a plasma torch (e.g., a series of 4 second torch as contrasted with a series of 60 second torch cuts), shortening the plasma gas ramp down time from about 400 milliseconds to about 100 milliseconds doubles the electrode life. Thus, the invention allows a given torch or cutting system to utilize customized plasma gas flow control profiles for different cutting situations, thereby extending and prolonging electrode life.

These types of benefits were previously unachievable for a number of reasons. Previous gas control systems tended to have inflexible gas control capabilities. On-off solenoid valves (sometimes in combinations) were used, valve timing was adjusted to empirically compensate for gas hose length effects, and swirl rings were ported to achieve specific objectives. Prior art systems thus lacked versatility when different cutting parameters were required. Either significant setup efforts were required to reconfigure them for a new cutting operation, or they were setup to achieve overall "average" acceptable performance. That is, they could do several things acceptably well, but did not achieve exceptional results for any given cutting situation. Previous gas control technologies in the art also lacked sufficient precision to identify and obtain the results of the invention. Applicants understand the performance impact of fine, precise control of the plasma and/or shield gas flows and can achieve additional performance enhancements. Gas ramp up times can be varied based on pierce type (e.g., whether internal features or external features are being cut), the shape to be cut, material thickness, material type (e.g., aluminum, stainless steel, carbon steel), cut type (e.g., a fine cut with intricate features, an interior cut, a straight cut, or a gentle contour), and actual or predicted cut duration. Actual cut duration information can be determined directly based on power supply output characteristics, such as output current level and history. Pierce type characteristics can be used to limit the size of the divot during pierce, especially when cutting internal features. Gas ramp up and/or ramp down curves can be slowed to produce improved cut characteristics when the cut geometry includes cutting fine, intricate shapes or when the workpiece is especially thin.

Although feedback control techniques are generally preferred, open loop control systems can also be employed. Such open loop control methods can be based on, e.g., empirical test results or calculated values. The power supply output information can also be used for open loop control, e.g., using the techniques similar to those described above for gas control.

Such ramp up and ramp down techniques for the plasma and/or shield gases can be conveniently implemented, e.g., automatically, using DSP 215 (e.g., a CNC). In some embodiments, cut tables including specific cut information based on variables such as those identified above can be used. These parameters can be stored, e.g., in electronic form, in a "cut table" for quick reference and utilization by the cut program. When a workpiece requiring a longer cut length and cut duration is to be cut, the cut table information has a longer plasma gas ramp down time. Thus, the cut table can store cutting shapes and parameters for ready reference by the cut program or, e.g., for selection and use by the equipment operator. In such embodiments, a manual mode can allow the operator to include having no plasma gas ramp down (i.e., an instantaneous ramp down time) at the end of a cut. For example, automated ramp up sequences can be used in combination with abrupt or manual gas termination techniques.

Figure 7:
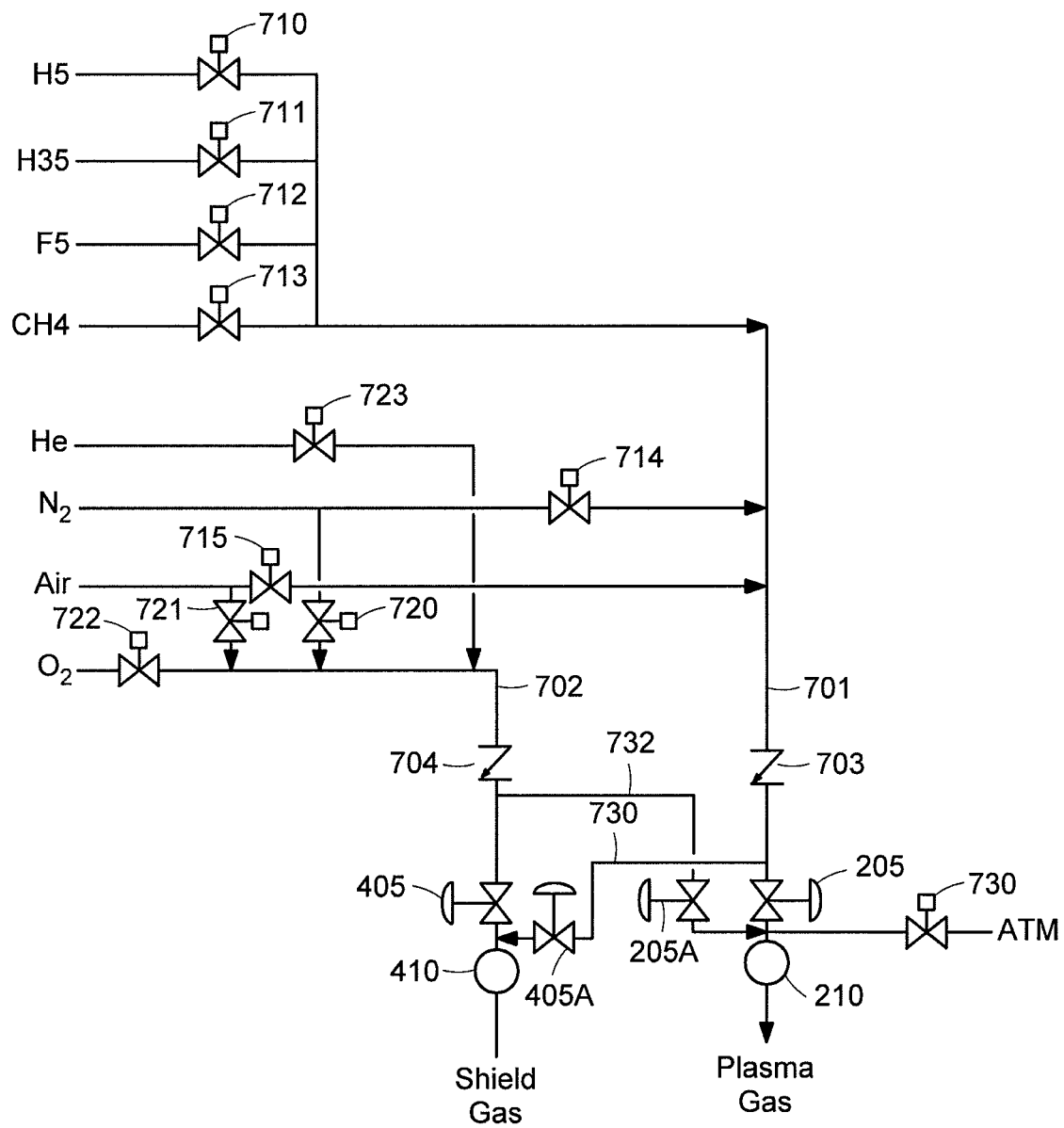
FIG. 7 is a more detailed representation of a combined plasma gas and shield gas supply system to a plasma arc torch.

Using such a system, automated control of torch current levels and gas flow rates can be conveniently and consistently utilized for consistent and optimized cutting operations. Such a system can be employed to consistently take full advantage of specific cutting information that has been previously optimized in view of the many inter-related variables that affect cutting operations, FIG. 7 is a more detailed representation of a combined plasma gas and shield gas supply system to a plasma arc torch that provides enhanced operating flexibility. This figure illustrates how seven different supply gases can be efficiently incorporated into a system providing two cut gases 701, 702, each cut gas being available to provide plasma gas and/or shield gas.

For example, different plasma gas compositions are preferred when cutting different workpiece materials or thicknesses. FIG. 7 illustrates a system that can supply H5 (5% hydrogen content, 95% argon) via on-off solenoid valve 710, H35 (35% hydrogen content, 65% argon) via on-off solenoid valve 711, F5 (5% hydrogen content, 95% nitrogen) via on-off solenoid valve 712, and/or methane (CH4) via on-off solenoid valve 713 as a first cut gas 701, such as a plasma gas. Nitrogen (N2) as a first cut gas can also be supplied via on-off solenoid valve 714 and air via on-off solenoid valve 715. A check valve 703 can be included in the first cut gas line. This first cut gas 701 can be channeled through a plasma gas programmable control valve 205 positioned adjacent the plasma torch, and through sensor 210 as described above.

Nitrogen can also be supplied as a second cut gas 702 via on-off solenoid valve 720, air via on-off solenoid valve 721, helium via on-off solenoid valve 723, and O2 (oxygen) via on-off solenoid valve 722. A check valve 704 can be included in the second cut gas line. As illustrated, the second cut gas can be used as a shield gas, which can pass through a shield gas programmable control valve 405 positioned adjacent the plasma arc torch, and through sensor 410 as described above. Although not shown, a DSP 215 can be used to manipulate, e.g., the programmable control valves 205, 205A, 405, and 405A, and/or some or all of the on-off solenoid valves 710, 711, 712, 713, 714, 715, 720, 721, 722, and 730.

This embodiment also features crossover lines 730 and 732. Crossover line 730 allows the first cut gas 701 to be used as a shield gas; crossover line 732 allows the second cut gas 702 to be used as a plasma gas, as illustrated. Each of the crossover lines includes a programmable control valve 205A, 405A, such as a proportional solenoid control valve, which is used to precisely control the amount of crossover gas flow. For embodiments incorporating this crossover flow functionality, it is important that any crossover programmable control valve 205A, 405A be positioned adjacent the plasma arc torch. Crossover gas flow can be used to augment or replace other gases already flowing in the system.

Although the previous discussion has focused primarily on programmable control valves (e.g., 205, 405) that are located adjacent the torch (e.g., within 2 feet, 6 feet, or 10 feet of the torch), embodiments also include torches into which the programmable control valve functionality has been integrated. For example, the plasma torch and a programmable control valve can be a unitary assembly, i.e., with no connecting hose between the two. Such closely-coupled embodiments include a programmable control valve that is directly attached, i.e., directly coupled (e.g., bolted) to the housing of a plasma torch. In some embodiments, the programmable control valve apparatus is actually disposed within the plasma torch body. Locating programmable control valve functionality (e.g., for the plasma gas or the shield gas) within the torch reduces the number of external components present in a plasma torch system.

Also illustrated in FIG. 7 is an optional vent valve 730 that can be used to vent plasma gas to the atmosphere (ATM). Vent valve 730 can be an on-off solenoid valve. In some embodiments (not shown) vent valve 730 can be a programmable control valve. This embodiment is particularly useful when cutting conditions are encountered in which it is desirable to decrease the flow rate of plasma gas flowing to the plasma chamber 207 more rapidly than is possible with only the plasma gas programmable control valve(s) 205, 205A. In other embodiments (not shown), vent valve 730 can be two or more on-off solenoid valves mounted in parallel, providing for increased venting capacity and control. The two or more vent valves of these embodiments can be operated independently or simultaneously and can have different sizes (i.e., different valve coefficients ($C_v$'s)).

Of course, other combinations are possible. Gas supplies other than those illustrated can be used, and various techniques known to those of skill in the art can be used, e.g., to mix different gas sources. For example, a plasma gas mixture can be formed by mixing methane and H35 using techniques and instrumentation (not shown) known to the skilled artisan. In addition to the mixing techniques described above using crossover lines 730 and 732, additional gas supplies can be added adjacent the torch and these additional gas supplies can be controlled using programmable control valves. An embodiment includes adding a reducing gas stream (such as methane) to the shield gas between programmable control valve 405 and sensor 410, such that the flow of the reducing gas is controlled with a programmable control valve. More than one additional gas (such as the reducing gas stream) can be added in this manner. Similar techniques can be used for the plasma gas. Many other arrangements and combinations are also possible.

While the invention has been particularly shown and described with reference to specific preferred embodiments, it should be understood by those skilled in the art that various changes in form and detail may be made therein without departing from the spirit and scope of the invention as defined by the appended claims.

Figure 8:
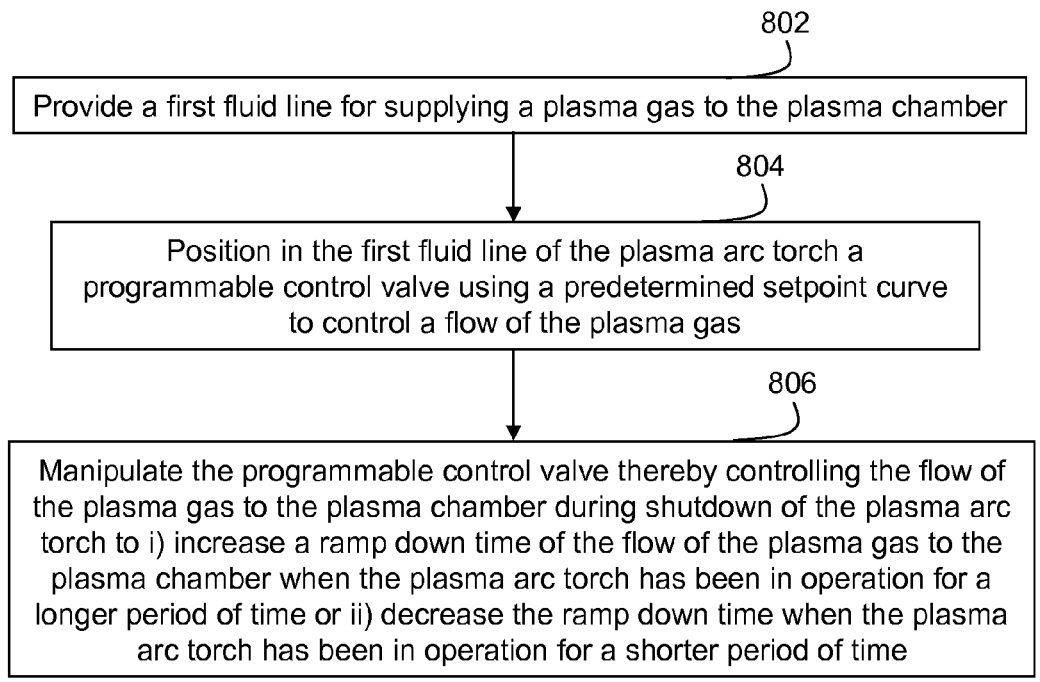
FIG. 8 is flow diagram depicting a method for controlling plasma gas flow to a plasma arc torch, in accordance with an embodiment of the invention.

FIG. 8 is a flow diagram depicting a method for controlling plasma gas flow to a plasma arc torch, in accordance with an embodiment of the invention. The method can prolong the life of an electrode of the plasma arc torch or optimize a duty cycle for operating the plasma arc torch. The method includes providing a first fluid line for supplying a plasma gas to the plasma chamber of the plasma arc torch (step 802). The method also includes positioning in the first fluid line a programmable control valve using a predetermined setpoint curve to control a flow of the plasma gas (step 804). The method further includes manipulating the programmable control valve thereby controlling the flow of the plasma gas to the plasma chamber during shutdown of the plasma arc torch to: (i) increase a ramp down time of the flow of the plasma gas to the plasma chamber when the plasma arc torch has been in operation for a longer period of time or (ii) decrease the ramp down time when the plasma arc torch has been in operation for a shorter period of time (step 806).

We claim:

1. A method for control of a gas flow to a plasma arc torch for prolonging a life of an electrode or optimizing a duty cycle, the plasma arc torch including a plasma chamber defined by the electrode and a nozzle and disposed within a body of the plasma arc torch, the method comprising the steps of:

providing a first fluid line for supplying a plasma gas to the plasma chamber;

positioning in the first fluid line of the plasma arc torch a programmable control valve using a predetermined setpoint curve to control a flow of the plasma gas based on associating the flow with a duration of an operation of the electrode producing a plasma arc; and controlling the flow of the plasma gas to the plasma chamber during shutdown of the plasma arc torch, the controlling comprising: (i) increasing, by manipulating the programmable control valve via a digital signal processor, a ramp down time of the flow of the plasma gas to the plasma chamber for a longer duration electrode operation or (ii) decreasing, by manipulating the programmable control valve via the digital signal processor, the plasma gas ramp down time for a shorter duration electrode operation.

2. The method of claim 1 wherein the programmable control valve is directly coupled to the body of the plasma arc torch.

3. The method of claim 1 wherein the programmable control valve controls the flow of the plasma gas a plurality of times during a ramp cycle of the plasma gas.

4. The method of claim 1 wherein at least a portion of the plasma gas is vented to the atmosphere through a vent valve.

5. The method of claim 4 wherein the vent valve includes two or more on-off solenoid valves mounted in parallel.

6. The method of claim 4 wherein the vent valve includes a programmable control valve.

7. The method of claim 1 wherein the plasma gas comprises at least one of oxygen, nitrogen, hydrogen, methane, helium, or argon.

8. A plasma arc torch for cutting a workpiece, the plasma arc torch having a plasma gas source to supply a plasma chamber, such that an electrical current passing between an electrode and a nozzle produces a plasma arc that exits the plasma arc torch through a nozzle exit orifice, the plasma arc torch comprising:
  a means for sensing a parameter in a first fluid line that supplies a plasma gas from the plasma gas source; and
  a means for controlling a flow of the plasma gas based on the sensed parameter using a programmable control valve disposed in the first fluid line of the plasma arc torch, the programmable control valve using a predetermined setpoint curve to prolong electrode life or to optimize a duty cycle based on associating the flow with a duration of an operation of the electrode producing the plasma arc by: (a) increasing the plasma gas ramp down time for a longer duration electrode operation or (b) decreasing the plasma gas ramp down time for a shorter duration electrode operation.

9. The plasma arc torch of claim 8 wherein the programmable control valve is directly coupled to the plasma arc torch.

10. The plasma arc torch of claim 8 further comprising a plasma gas vent valve that includes at least one of a programmable control valve or a plurality of on-off solenoid valves.

11. A method for control of a plasma gas flow to a plasma arc torch for prolonging a life of an electrode or optimizing a duty cycle, the plasma arc torch including a plasma chamber defined by the electrode and a nozzle and disposed within a body of the plasma arc torch, the method comprising the steps of:
  providing a first fluid line for supplying a plasma gas to the plasma chamber;
  positioning in the first fluid line of the plasma arc torch a programmable control valve using a predetermined setpoint curve to control a flow of the plasma gas; and
  controlling the flow of the plasma gas to the plasma chamber during shutdown of the torch, the controlling comprising: (i) increasing, by manipulating the programmable control valve via a digital signal processor, a ramp down time of the flow of the plasma gas to the plasma chamber when the plasma arc torch has been operated for a duration of an operation of the electrode at a higher current level or (ii) decreasing, by manipulating the programmable control valve via the digital signal processor, the ramp down time of the flow of the plasma gas to the plasma chamber when the plasma arc torch has been operated for a duration of an operation of the electrode at a reduced current level.

12. The method of claim 11 wherein the programmable control valve is directly coupled to the body of the plasma arc torch.

13. The method of claim 11 wherein the programmable control valve controls the flow of the plasma gas a plurality of times during a ramp cycle of the plasma gas.

14. The method of claim 11 wherein at least a portion of the plasma gas is vented to the atmosphere through a vent valve.

15. The method of claim 14 wherein the vent valve includes two or more on-off solenoid valves mounted in parallel.

16. The method of claim 14 wherein the vent valve includes a programmable control valve.

17. The method of claim 11 wherein the plasma gas comprises at least one of oxygen, nitrogen, hydrogen, methane, helium, or argon.

18. A plasma arc torch for cutting a workpiece, the plasma arc torch having a plasma gas source to supply a plasma chamber, such that an electrical current passing between an electrode and a nozzle produces a plasma arc that exits the plasma arc torch through a nozzle exit orifice, the plasma arc torch comprising:
  a means for sensing a parameter in a first fluid line that supplies a plasma gas from the plasma gas source; and
  a means for controlling a flow of the plasma gas based on the sensed parameter using a programmable control valve disposed in the first fluid line of the plasma torch, the programmable control valve using a predetermined setpoint curve to prolong electrode life or to optimize a duty cycle by: (a) increasing the first gas ramp down time when the plasma arc torch has been operated for a duration of an operation of the electrode at a higher current level, or (b) decreasing the first gas ramp down time when the plasma arc torch has been operated for a duration of an operation of the electrode at a reduced current level.

19. The plasma arc torch of claim 18 wherein the programmable control valve is directly coupled to the plasma arc torch.

20. The plasma arc torch of claim 18 further comprising a plasma gas vent valve that includes at least one of a programmable control valve or a plurality of on-off solenoid valves.

* * * * *